United States Patent [19]

Matzner et al.

[11] Patent Number: 4,642,327

[45] Date of Patent: Feb. 10, 1987

[54] NOVEL POLYETHERIMIDES

[75] Inventors: Markus Matzner, Edison, N.J.; Donald M. Papuga, Danbury, Conn.

[73] Assignee: Amoco Corporation, Chicago, Ill.

[21] Appl. No.: 772,882

[22] Filed: Sep. 5, 1985

[51] Int. Cl.⁴ .............................................. C08G 65/40
[52] U.S. Cl. .................................. 525/434; 525/436; 525/185
[58] Field of Search .................. 525/434, 436, 185

[56] References Cited

U.S. PATENT DOCUMENTS

| | | | |
|---|---|---|---|
| 4,293,670 | 10/1981 | Robeson et al. | 525/436 |
| 4,473,684 | 9/1984 | Maresca et al. | 525/436 |
| 4,481,325 | 11/1984 | Giles, Jr. | 525/434 |
| 4,503,168 | 3/1985 | Hartsing, Jr. | 525/434 |
| 4,540,748 | 9/1985 | Matzner et al. | 528/185 |
| 4,550,140 | 10/1985 | Rimsa et al. | 525/434 |

*Primary Examiner*—John Kight
*Assistant Examiner*—M. L. Moore
*Attorney, Agent, or Firm*—Donald M. Papuga; William H. Magidson

[57] ABSTRACT

This invention relates to a novel class of polyetherimides. The subject polyetherimides display a unique combination of high temperature properties, toughness, and melt processability. They are suitable for molding, extrusion, and coating applications. They are also of interest as components of blends, as filled materials, and in composites.

15 Claims, No Drawings

NOVEL POLYETHERIMIDES

FIELD OF THE INVENTION

This invention relates to a novel class of polyetherimides. The subject polyetherimides display a unique combination of high temperature properties, toughness, and melt processability. They are suitable for molding, extrusion, and coating applications. They are also of interest as components of blends, as filled materials, and in composites.

BACKGROUND OF THE INVENTION

U.S. Pat. Nos. such as 3,847,867, 3,847,869, 3,850,885, 3,852,242, 3,855,178, etc. describe the general class of polyetherimides of the formula:

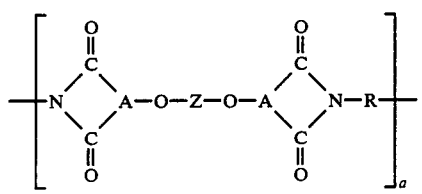

where a represents a whole number in excess of 1, e.g., 10 to 10,000 or more, the group —O—A< is selected from:

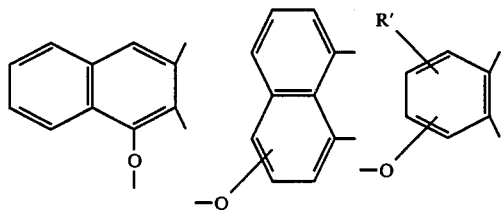

R' being hydrogen, lower alkyl or lower alkoxy, preferably the polyetherimide includes the latter —O—A< group where R' is hydrogen such that the polyetherimide is of the formula:

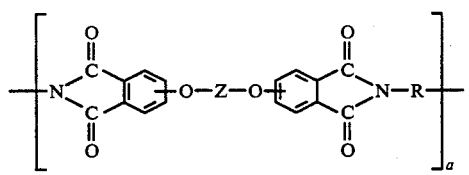

and the divalent bonds of the —O—Z—O— radical are in the 3,3';3,4';4,3' or the 4,4' position. Z is a member of the class consisting of (1)

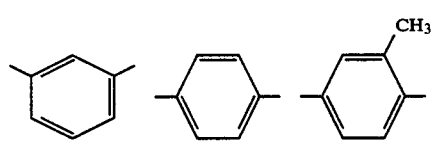

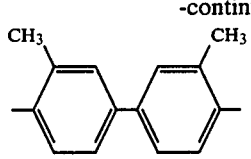

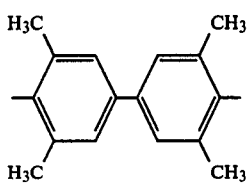

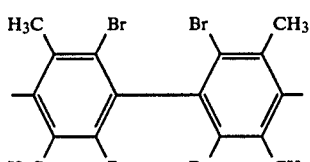

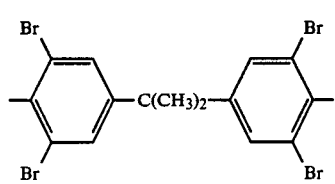

and (2) divalent organic radicals of the general formula:

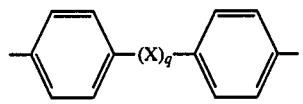

where X is a member selected from the class consisting of divalent radicals of the formulas, $$-C_yH_{2y}-, -\overset{O}{\underset{\|}{C}}-, -\overset{O}{\underset{\underset{\|}{O}}{\overset{\|}{S}}}-, -O- \text{ and } -S-,$$

where q is 0 or 1, y is a whole number from 1 to 5, and R is a divalent organic radical selected from the class consisting of (1) aromatic hydrocarbon radicals having from 6–20 carbon atoms and halogenated derivatives thereof, (2) alkylene radicals and cycloalkylene radicals having from 2–20 carbon atoms, $C_{(2-8)}$ alkylene terminated polydiorganosiloxane, and (3) divalent radicals included by the formula

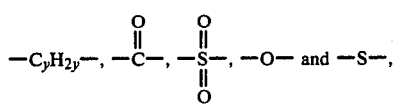

where Q is a member selected from the class consisting of

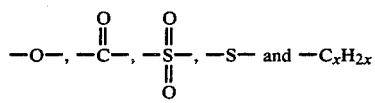

where x is a whole number from 1 to 5 inclusive.

Particularly preferred polyetherimides include those where —O—A< and Z respectively are:

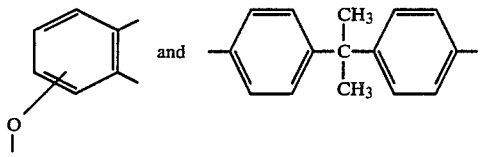

and R is selected from:

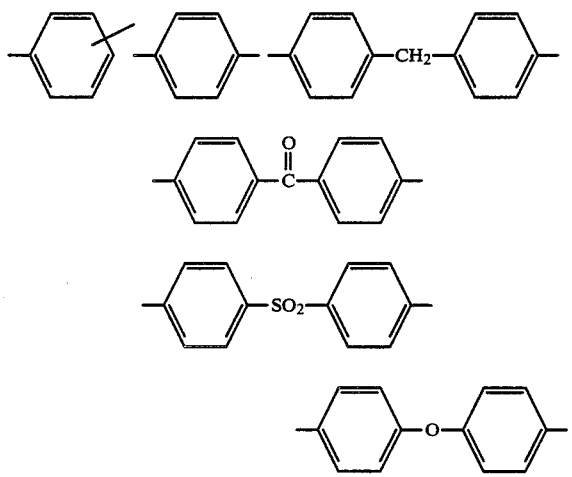

The polyetherimides where R is metaphenylene are most preferred.

One of the principal drawbacks of the above described polyetherimides is their lack of good fabricability.

THE INVENTION

It has been found that the drawback mentioned above can be obviated in the polyetherimides based on oligomeric dihydroxy compounds as represented by the formula

HOZOH wherein the molecular weight of Z is ≧1,500.

The compound HOZOH is selected from the class consisting of dihydroxy-terminated poly(phenylene oxides), dihydroxy-terminated poly(aryl ethers), and dihydroxy-terminated poly(aryl ether ketones).

Broadly, the dihydroxy-terminated poly(phenylene oxides) can be prepared by reacting polyphenylene oxides containing quinones under reaction conditions, e.g., time, temperature and pressure, which facilitate reaction of at least a portion, and preferably substantially all of any quinone species of polyphenylene oxides, subject to the proviso that the reaction is carried out in a reaction medium substantially free of (1) any monophenol reactant and (2) any active oxidative coupling catalyst system known to those skilled in the art which promotes self-condensation of monophenols to form polyphenylene oxides.

Accordingly, any prior art quinone containing polyphenylene oxide reaction product can be employed including those described in, for example, U.S. Pat. Nos. 3,306,879; 3,914,266; 3,972,851 and 3,965,069, subject to the proviso that the reaction products be separated from substantially all of the active catalyst system as well as substantially all of any unreacted phenol prior to reacting the quinone with the polyphenylene oxide. Separation of the active catalyst system from the prepared prior art polyphenylene oxides can be carried out by any means, e.g., by purging oxygen from the reaction medium via inert gas displacement by argon, nitrogen, etc., where substantially all of the oxygen or air employed in the oxidative coupling process is separated from the polymer; by centrifuging the reaction products whereby substantially all of any copper or manganese component of the active catalyst system and/or any unreacted monophenol contained within the aqueous phase reaction products is separated from the organic phase which comprises substantially all of the polyphenylene oxide and quinone plus minor amounts of any primary, secondary or tertiary amines employed in the prior art catalytic processes.

As stated hereinbefore, any reaction temperature can be employed for the coupling. Preferably, temperatures of from 0° to 100° C. are used.

Any prior art polyphenylene oxide can be employed, regardless of intrinsic viscosity or the amount of quinone contained within the polyphenylene oxide charged to the reaction medium which polyphenylene oxide is prepared according to any of the prior art methods. Illustrative of prior art, etc., polyphenylene oxides that can be employed are those of the formula:

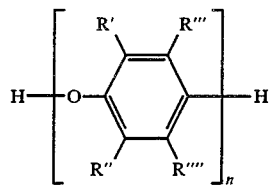

wherein n is at least such that the molecular weight of the coupled product be at least 1,500 or greater, the R's are hydrogen, a hydrocarbon radical, a halohydrocarbon radical having at least 2 carbon atoms between the halogen atoms and phenol nucleus, a hydrocarbonoxy radical, or a halohydrocarbonoxy radical having at least two carbon atoms between the halogen atoms and phenol nucleus. The substituents can be the same or different.

The prduct is a quinone-coupled polyphenylene oxide having an average hydroxyl group per molecule value greater than the average hydroxyl group value associated with the starting polyphenylene oxide reactant.

Broadly, the quinone-coupled polyphenylene oxides can be illustrated by the formula

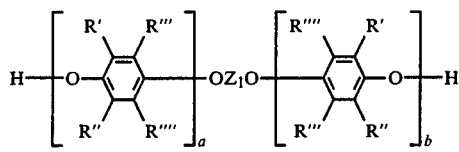 (I)

wherein independently each —OZ₁O— is a divalent aromatic residue derived from a quionone, Z is a divalent arylene radical, a and b are at least such that the molecular weight of the dihydroxy compound be at least 1,500 or greater, the R's are as heretofore defined. Preferred quinone-coupled polyphenylene oxide products are of formula (I) above wherein independently each R', R", R'", and R"" is hydrogen, a hydrocarbon radical, a halohydrocarbon radical, and even more preferably where R' and R" are methyl radicals, R'" and R"" being hydrogen atoms.

The dihydroxy-terminated poly(aryl ether)oligomers may be described as linear, thermoplastic polyarylene polyethers wherein the arylene units are interspersed with either ether, or sulfone or ketone linkages. These resins may be obtained by reaction of an excess of an alkali metal double salt of a dihydric phenol and a dihalobenzenoid or dinitrobenzenoid compound, either or both of which contain a sulfone or a ketone linkage, i.e., —SO₂— or —CO—, between arylene groupings, to provide sulfone or ketone units in the polymer chain in addition to arylene units and ether units. The polymer has a basic structure comprising recurring units of the formula: O—E—O—E' wherein E is the residuum of the dihydric phenol, and E' is the residuum of the benzenoid compound having an inert electron withdrawing group in at least one of the positions ortho and para to the valence bonds; both of said residua are valently bonded to the ether oxygens through aromatic carbon atoms. Such aromatic polyethers are included within the class of polyarylene polyether resins described in, for example, U.S. Pat. Nos. 3,264,536 and 4,175,175. It is preferred that the dihydric phenol be a weakly acidic dinuclear phenol such as, for example, the dihydroxyl diphenyl alkanes or the nuclear halogenated derivatives thereof, such as, for example, the 2,2-bis(4-hydroxyphenyl)propane, 1,1-bis(4-hydroxyphenyl)2-phenyl ethane, bis(4-hydroxyphenyl)methane, or their chlorinated derivatives containing one or two chlorines on each aromatic ring. Other materials also termed appropriately "bisphenols" are also highly valuable and preferred. These materials are the bisphenols of a symmetrical or unsymmetrical joining group, the latter, for example, being an ether oxygen (—O—), carbonyl

sulfone

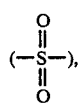

or hydrocarbon residue in which the two phenolic nuclei are joined to the same or different carbon atoms of the residue.

Such dinuclear phenols can be characterized as having the structure:

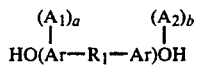

wherein Ar is an aromatic group and preferably is a phenylene group, A₁ and A₂ can be the same or different inert substituent groups such as alkyl groups having from 1 to 4 carbon atoms, halogen atoms, i.e., fluorine, chlorine, bromine or iodine, or alkoxy radicals having from 1 to 4 carbon atoms, a and b are integers having a value of from 0 to 4, inclusive, and R₁ is representative of a bond between aromatic carbon atoms as in a dihydroxy-diphenyl, such as 4,4', 3,3', or 4,3'-dihydroxydiphenyl; or is a divalent radical, including, for example, radicals such as

—O—, —S—, —SO—, —S—S—, —SO₂, and divalent hydrocarbon radicals such as alkylene, akylidene, cycloalkylene, cycloalkylidene, or the halogen, alkyl, aryl or like substituted alkylene, alkylidene and cycloaliphatic radicals or an aromatic radical; it may also represent rings fused to both Ar groups.

Examples of specific dihydric polynuclear phenols include among other the bis-(hydroxyphenyl)alkanes such as 2,2-bis-(4-hydroxyphenyl)propane, 2,4'-dihydroxydiphenylmethane, bis-(2-hydroxyphenyl)methane, bis-(4-hydroxyphenyl)methane, bis(4-hydroxy-2,6-dimethyl-3-methoxyphenyl)methane, 1,1-bis-(4-hydroxyphenyl)ethane, 1,2-bis-(4-hydroxyphenyl)ethane, 1,1-bis-(4-hydroxy-2-chlorophenyl)ethane, 1,1-bis-(3-methyl-4-hydroxyphenyl)propane, 1,3-bis-(3-methyl-4-hydroxyphenyl)propane, 2,2-bis-(3-phenyl-4-hydroxyphenyl)propane, 2,2-bis-(3-isopropyl-4-hydroxyphenyl)propane, 2,2-bis-(2-isopropyl-4-hydroxyphenyl)propane, 2,2-bis-(4-hydroxynaphthyl)propane, 2,2-bis-(4-hydroxyphenyl)pentane, 3,3-bis-(4-hydroxyphenyl)pentane, 2,2-bis-(4-hydroxyphenyl)heptane, bis-(4-hydroxyphenyl)phenylmethane, 2,2-bis-(4-hydroxypenyl)-1-phenyl-propane, 2,2-bis-(4-hydroxyphenyl)1,1,1,3,3,3,-hexafluoropropane, and the like;

di(hydroxyphenyl)sulfones such as bis-(4-hydroxyphenyl)sulfone, 2,4'-dihydroxydiphenyl sulfone, 5-chloro-2,4'-dihydroxydiphenyl sulfone, 5'-chloro-4,4'-dihydroxydiphenyl sulfone, and the like;

di(hydroxyphenyl)ethers such as bis-(4-hydroxyphenyl)ether, the 4,3'-, 4,2'-2,2'-2,3'-,dihydroxydiphenyl ethers, 4,4'-dihydroxy-2,6-dimethyldiphenyl ether,bis-(4-hydroxy-3-isobutylphenyl)ether, bis-(4-hydroxy-3-isopropylphenyl)ether, bis-(4-hydroxy-3-chlorophenyl)ether, bis-(4-hydroxy-3-fluorophenyl)ether, bis-(4-hydroxy-3-bromophenyl)ether, bis-(4-hydroxynaphthyl)ether, bis-(4-hydroxy-3-chloronaphthyl)ether, and 4,4'-dihydroxy-3,6-dimethoxydiphenyl ether.

As herein used the E term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through an aromatic ether oxygen atom.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho and para to the halogen or nitro group. The dihalobenzenoid or dinitrobenzenoid compound can be either mononuclear where the halogens or nitro groups are attached to the same benzenoid rings or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1% and preferably below 0.5% for best results.

An electron withdrawing group is employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated. Preferably, all of the substituents on the bezenoid nucleus are either hydrogen (zero electron withdrawing), or other groups having a positive sigma value, as set forth in J. F. Bunnett in *Chem. Rev.* 49, 273 (1951) and *Quart. Rev.*, 12, 1 (1958). See also Taft, Steric Effects in *Organic Chemistry*, John Wiley & Sons (1956), chapter 13; *Chem, Rev.*, 53, 222; *JACS,* 74,3120; and *JACS,* 75, 4231.

The activating group can be basically either of two types:

(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine.

(b) divalent groups which can activate displacement of halogens or nitro groups on two different rings, such as the sulfone group

the carbonyl group

the vinylene group

the sulfoxide group

the azo group —N=N—; the saturated fluorocarbon groups —CF$_2$CF$_2$—; organic phosphine oxides

where R$_2$ is a hydrocarbon group, and the ethylidene group

where X$_1$ can be hydrogen or halogen, and activating groups within the nucleus which can activate halogens or nitro functions on the same or adjacent ring such as in the case with difluorobenzoquinone, 1,4- or 1,5- or 1,8-difluoroanthraquinone, etc.

If desired, the oligomers may be made with mixtures of two or more dihalobenzenoid or dinitrobenzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atom or nitro group on the benzenoid nucleus.

The polyarylene polyether oligomers of this invention are prepared by methods well known in the art as for instance the one-step reaction of a double alkali metal salt of an excess of the dihydric phenol with a dihalobenzenoid compound in the presence of specific liquid organic sulfoxide or solfone solvents under substantially anhydrous conditions. Catalysts are not necessary for this reaction.

The oligomers may also be prepared in a two-step process in which an excess of the dihydric phenol is first converted in situ in the primary reaction solvent to the alkali metal salt by the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol are admixed and reacted with the dihalobenzenoid or dinitrobenzenoid compound.

The polymerization reaction proceeds in the liquid phase of a sulfoxide or sulfone organic solvent at elevated temperatures. In order to obtain a smooth and easy reaction, the system should be substantially anhydrous, and preferably with less than 0.5 percent by weight water in the reaction mixture.

In another embodiment, the poly(aryl ether)oligomers may be prepared by the high temperature condensation of an excess of the diphenol with the dihalo or dinitro aromatic compound in an inert aprotic solvent in the presence of at least equimolar amounts of an alkali or alkaline earth metal carbonate or bicarbonate. Preferably, mixtures of potassium carbonate with sodium carbonate are used. N-methylpyrrolidone, dimethyl sulfoxide, sulfolane, dimethylacetamide and diphenyl sulfone are preferred solvents.

For all of the methods listed above an excess of the diphenol is used so as to ensure dihydroxy-termination. The higher the excess of the diphenol, the lower the molecular weight of the oligomer produced.

A preferred form of the polyarylene polyether oligomers of this invention are those prepared using the dihydric polynuclear phenols of the following types, including the derivatives thereof which are substituted with inert substituent groups on the aromatic nuclei:

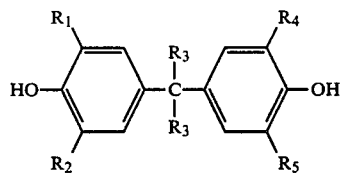

in which the $R_1$, $R_2$, $R_3$, $R_4$, $R_5$ groups represent independently hydrogen, lower alkyl, aryl and the halogen substituted groups thereof, which can be the same or different; the compound with $R_3 = CH_3$ being preferred: examples include bisphenol-A and

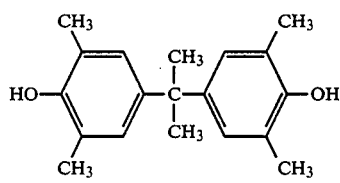

other preferred bisphenols are:

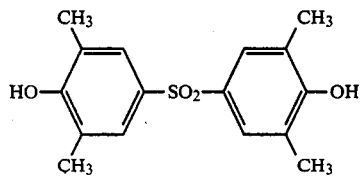

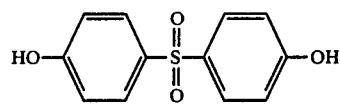

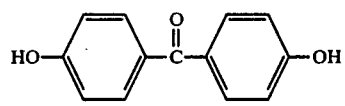

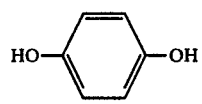

and nuclearly substituted derivatives of all of the above.

It is also contemplated in this invention to use a mixture of two or more different dihydric phenols to accomplish the same ends as above. Thus when referred to above the —E— residuum in the polymer structure can actually be a mixture of the same or different atomatic residua.

The preferred poly(aryl ether)oligomers have a molecular weight of at least 1,500 and repeating units of the formula:

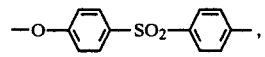

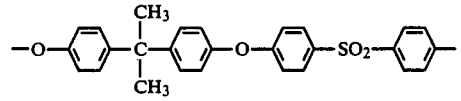

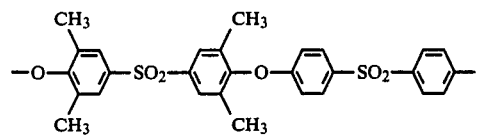

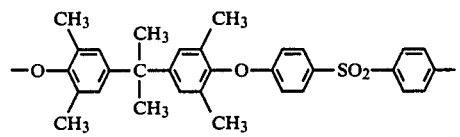

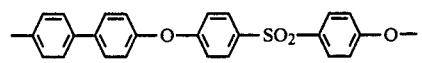

The dihydroxy-terminated poly(aryl ketone)oligomers which are suitable for use herein can be generically characterized as containing repeating units of the following formula:

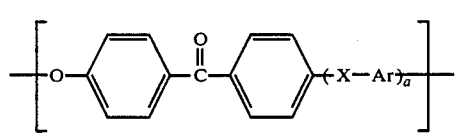

(I)

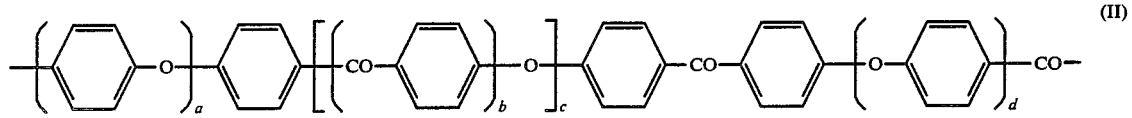
(II)
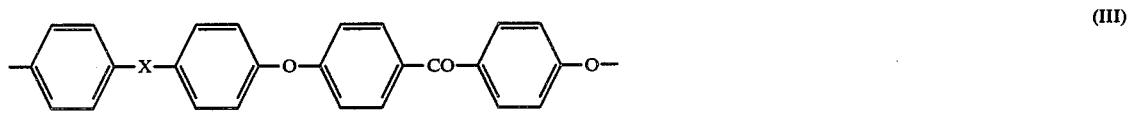
(III)
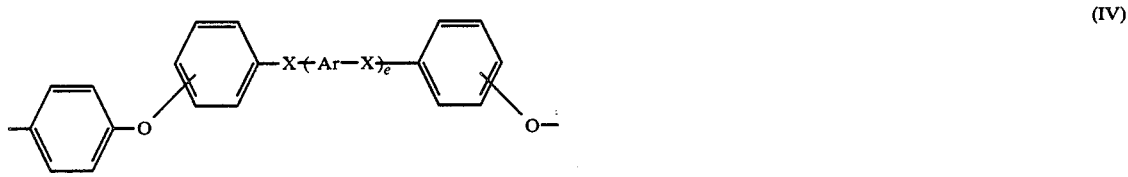
(IV)
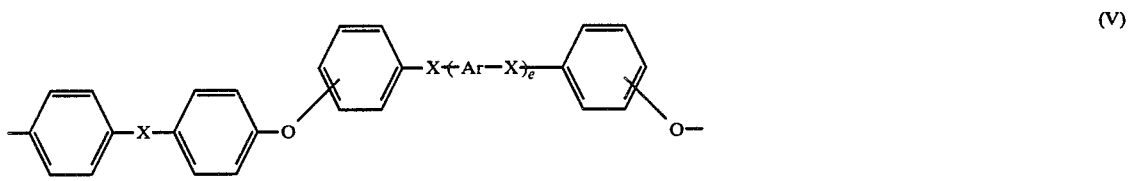
(V)
wherein Ar is independently a divalent aromatic radical selected from phenylene, biphenylene, or naphthalene, X is independently O,
$SO_2$, or a direct bond and a is an integer of from 1 to 4, b, c, d and e are 0 to 1 and preferably d is 0 when b is 1.
Preferred poly(aryl ether ketone)oligomers include those having repeating units of the formula:
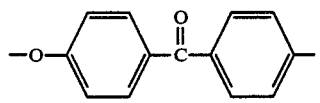
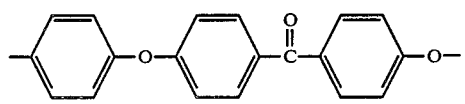
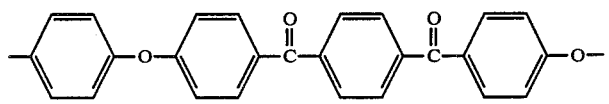
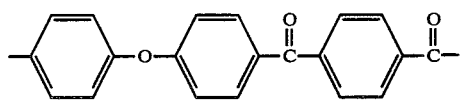
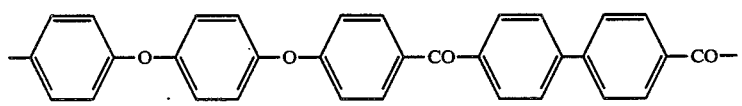
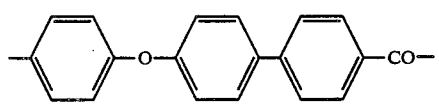
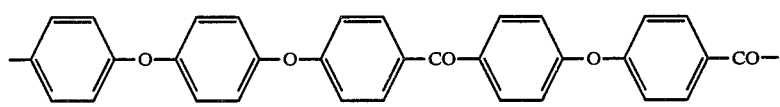

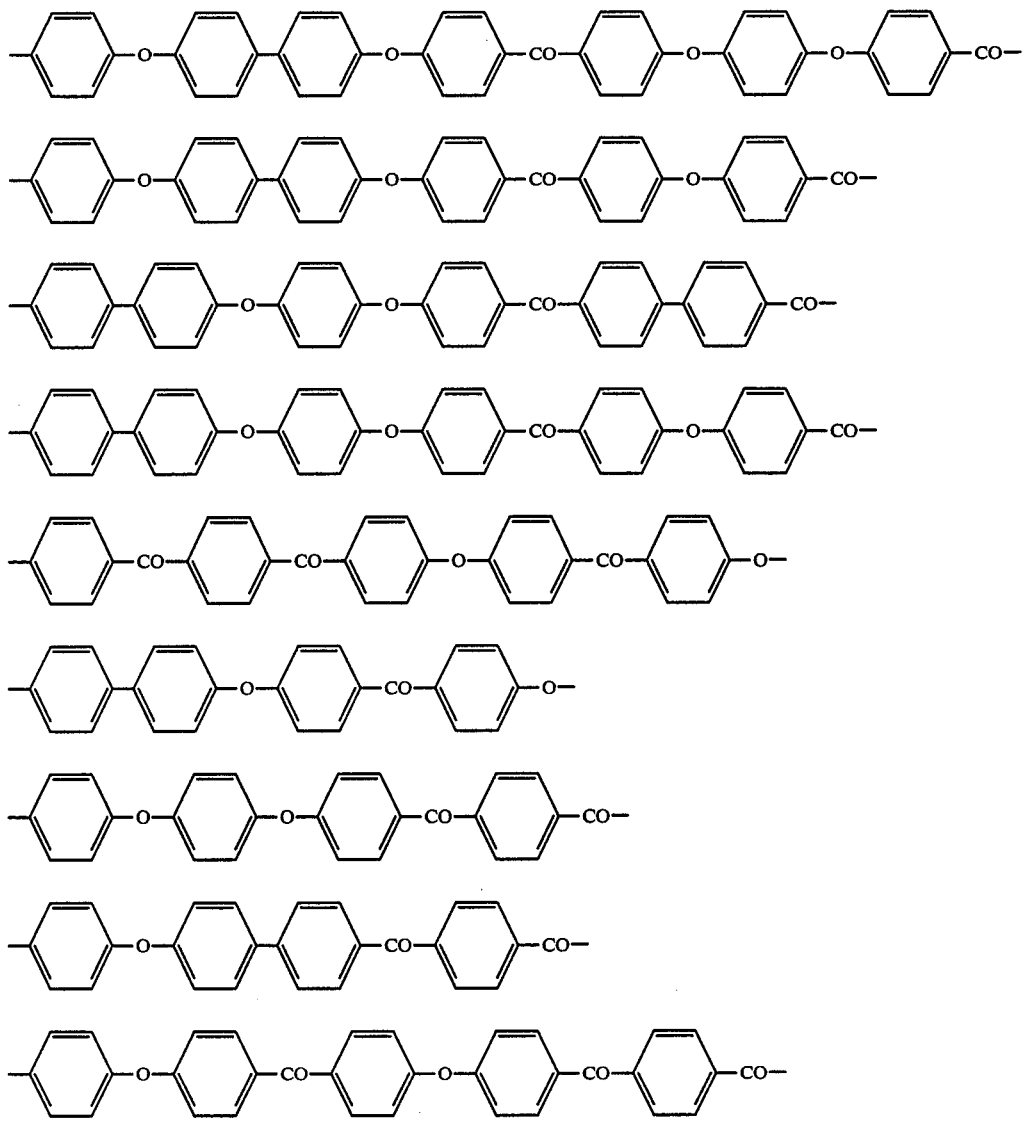

and copolymers thereof.

The process for preparing the poly(aryl ether ketone)oligomers comprises reacting an excess of at least one bisphenol with at least one dihalobenzenoid compound; and/or at least one halophenol followed by reaction with a small amount of a diphenol in order to ensure hydroxyl termination. The bisphenols may be depicted as follows:

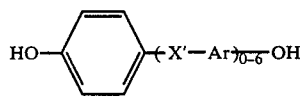

wherein X and X' are independently is O, $$\overset{O}{\underset{C,}{\|}}$$

$SO_2$, or a direct bond and Ar is independently a divalent radical selected from phenylene, biphenylene or naphthalene, most preferably 1,4-phenylene.

The dihalobenzenoid compound may be depicted as follows:

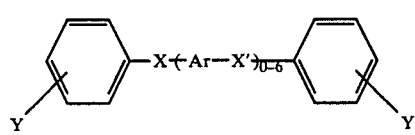

wherein Y is halogen, preferably fluorine or chlorine, or nitro, the Y's may be the same or different and are ortho or para to the X; Ar, X, and X' are as defined above with the proviso that X or X' ortho or para to the Y's are electron withdrawing groups, i.e., $$\overset{O}{\underset{C}{\|}}$$

or SO₂ in the preferred embodiment, each aromatic radical is para substituted and most preferably, 1,4-phenylene.

The halophenols may be depicted as follows:

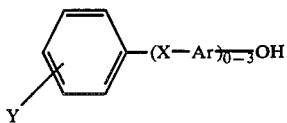

wherein Y, X, and Ar are as defined above with the proviso that the X ortho or para to Y is an electron withdrawing group, i.e.,

or SO₂.

Preferred bisphenols in such a process include:
hydroquinone,
4,4'-dihydroxybenzophenone,
4,4'-dihydroxybiphenyl,
4,4'-dihydroxydiphenyl ether,
4,4'-dihydroxydiphenyl sulfone, and
4,4'-bis(4-hydroxyphenylsulfonyl)biphenyl.

Preferred dihalobenzenoid and halophenol compounds include:
4,4'-dichlorodiphenyl sulfone,
4,4'-difluorodiphenyl sulfone,
4-(4-chlorobenzoyl)phenol,
4-(4-fluorobenzoyl)phenol,
4,4'-difluorobenzophenone,
4,4'-dichlorobenzophenone,
4-chloro-4'-fluorobenzophenone,
1,4-bis(4-fluorobenzoyl)benzene,
4,4'-difluorodiphenyl sulfone, and
1,3-bis(4-fluorobenzoyl)benzene.

The reaction is carried out by heating a mixture of one or more bisphenols and one or more dihalobenzenoid compounds or halophenols at a temperature of from about 100° to about 400° C. The reaction is conducted in the presence of added sodium carbonate and/or bicarbonate and potassium rubidium or cesium fluorides or chlorides or in the presence of sodium carbonate and/or bicarbonate and a higher alkali metal carbonate or bicarbonate. The sodium carbonate or bicarbonate and the chloride and fluoride salts should be anhydrous although, if hydrated salts are employed, where the reaction temperature is relatively low, e.g. 100° to 250° C., the water should be removed, e.g. by heating under reduced pressure, prior to reaching the reaction temperature.

Where high reaction temperatures (>250° C.) are used, it is not necessary to dehydrate the carbonate or bicarbonate first as any water is driven off rapidly before it can adversely affect the course of the reaction. Optionally, an entraining organic medium can be used to remove water from the reaction such as toluene, xylene, chlorobenzene, and the like.

The total amount of sodium carbonate and/or bicarbonate and potassium, rubidium or cesium fluoride or chloride employed should be such that there is at least 1 atom of total alkali metal for each phenol group, regardless of the anion (carbonate, bicarbonate or halide). Likewise where a halophenol is employed there should be at least one mole of total alkali metal per mole of halophenol.

Preferably, from about 1 to about 1.2 atoms of sodium for each phenol group is used. In another preferred embodiment from 0.001 to about 0.5 atoms of alkali metal (derived from alkali metal halide) is used for each phenol group.

The sodium and/or potassium carbonate and/or bicarbonate and potassium fluoride are used such that the ratio of potassium to sodium therein is from about 0.001 to about 0.5, preferably from about 0.01 to about 0.25, and most preferably from about 0.02 to about 0.20.

An excess of total alkali metal may be employed. Hence there may be about 1 to about 1.7 atoms of alkali metal per phenol group. While the use of a large excess of alkali metal may give rise to faster reactions, there is the attendant risk of cleavage of the resulting polymer, particularly when using higher temperatures and/or the more active alkali metal salts. Of course it is well known to those skilled in the art that cesium is a more active metal and potassium is a less active metal so that less cesium and more potassium is used. Further, it has been observed that the chloride salts are less active than the fluoride salts so that more chloride and less fluoride is used.

As indicated earlier, an excess of bisphenol relative to the dihalobenzenoid compound is used, in order to ensure oligomers having dihydroxyl termination. The higher the excess used, the lower the molecular weight of the resulting oligomer.

The reaction may be carried out in the presence of an inert solvent, or partially in the absence of a solvent.

Preferably a solvent is employed and is an aliphatic or aromatic sulphoxide or sulphone of the formula

where x is 1 or 2 and R and R' are alkyl or aryl groups and may be the same or different. R and R' may together form a divalent radical. Preferred solvents include dimethyl sulphoxide, dimethyl sulphone, sulpholane (1,1 dioxothiolan), or aromatic sulphones of the formula.

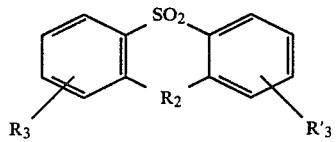

where R₂ is a direct link, an oxygen atom or two hydrogen atoms (one attached to each benzene ring) and R₃ and R'₃, which may be the same or different, are hydrogen atoms or phenyl groups. Examples of such aromatic sulphones include diphenylsulphone, ditolyl sulphone, tolylphenyl sulphone, dibenzothiophen dioxide, phenoxathiin dioxide and 4-phenylsulphonyl biphenyl. Diphenylsulphone is the preferred solvent. Other solvents that may be used include N,N-dimethyl formamide and N-methyl-2-pyrrolidinone, N,N-dimethylacetamide, and N-cyclohexyl pyrrolidone. In another embodiment the reaction is started in a relatively low boiling polar aprotic solvent such as dimethyl formamide, dimethylacetamide, dimethyl sulfoxide, N-methylpyrrolidinone, and the like. Heating at reflux results in the formation of low molecular weight product with attendant precipitation. The solvent may be removed and the low molecular weight product may be advanced if desired by solid state polymerization, i.e. by heating to a temperature in the range of from about 200° to about 400° C.; preferably, in inert atmosphere is maintained during this latter step.

The reaction temperature is in the range of from about 100° to about 400° C. and will depend on the nature of the reactants and the solvent, if any, employed. The preferred temperature is above 250° C. The reactions are preferably carried out at ambient pressure. However, higher or lower pressure can also be used. The reaction is generally carried out in an inert atmosphere.

For the production of some poly(aryl ether ketone)oligomers, it may be desirable to commence reaction at one temperature, e.g. between 200° and 250° C. and to increase the temperature as reaction ensues. This is particularly necessary when making higher molecular weight oligomers having only a low solubility in the solvent. Thus, there it is desirable to increase the temperature progressively to maintain the oligomer in solution as its molecular weight increases.

The poly(aryl ether ketone)oligomers may be produced by the process as described in, for example, U.S. Pat. No. 4,176,222. This process comprises heating in the temperature range of 100° C. to 400° C., (i) an excess of (a) at least one bisphenol and (b) at least one dihalobenzenoid compound, or (ii) a mixture of at least one halophenol with a diphenol in which in the dihalobenzenoid compound or halophenol the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the oligomer from the alkali metal halide.

The oligomers have molecular weights of at least 1,500.

The polyetherimides can be obtained by any of the methods well known to those skilled in the art including the reaction of any aromatic bis(ether anhydrides) of the formula:

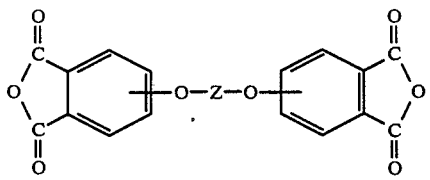

where Z is as defined hereinbefore with an organic diamine of the formula

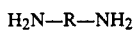

where R is as defined hereinbefore.

Aromatic bis(ether anhydride)s of the above formula include, for example, 2,2-bis[4-(2,3-dicarboxyphenoxy)-phenyl]-propane dianhydride; 4,4'-bis(2,3-dicarboxyphenoxy)-diphenyl ether dianhydride; 1,3-bis(2,3-dicarboxy-phenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)-diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'-(3,4-dicarboxyphenoxy)diphenyl-2,2-propane dianhydride; etc. and mixtures of such dianhydrides.

In addition, aromatic bis(ether anhydride)s also included by the above formula are shown by Koton, M. M.; Florinski, F. S. Bessonov, M. I.; Rudakov, A. P. (Institute of Heteroorganic compounds, Academy of Sciences, U.S.S.R.), U.S.S.R. 257,010, Nov. 11, 1969, Appl. May 3, 1967. In addition, dianhydrides are shown by M. M. Koton, F. S. Florinski, Zh. Org. Khim., 4(5), 774 (1968).

Typical organic diamines include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine, 2,4bis(β-amino-t-butyl)toluene, bis(p-β-amino-t-butylphenyl)ether, bis(p-β-methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenedediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl)tetramethyldisiloxane, bis(4-aminobutyl)tetramethyldisiloxane, etc.

In general, the reactions can be advantageously carried out employing well-known solvents, e.g., o-dichlorobenzene, m-cresol/toluene, etc. in which to effect interaction between the dianhydrides and the diamines at temperatures of from about 100° to about 250° C. Alternatively, the polyetherimides can be prepared by melt polymerization of any of the above dianhydrides with any of the above diamine compounds while heating the mixture of the ingredients at elevated temperatures with concurrent intermixing. Generally, melt polymerization temperatures between about 200° to 400° C. and preferably 230° to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity [η] greater than 0.2 deciliters per gram, preferably 0.35 to 0.60, or 0.7 deciliters per gram or even higher when measured in m-cresol at 25° C.

Included among the many methods of making the polyetherimides are those disclosed in Heath et al., U.S. Pat. No. 3,847,867, Williams U.S. Pat. No. 3,847,869, Takekoshi et al. U.S. Pat. No. 3,850,885, White U.S. Pat. Nos. 3,852,242 and 3,855,178, etc. These disclosures are incorporated herein in their entirety by reference for the purpose of teaching, by way of illustration, general and specific methods for preparing polyetherimides suitable for the polymers of this invention.

The polyetherimides of this invention may include mineral fillers such as carbonates including chalk, calcite and dolomite; silicates including mica, talc, wollastonite; silicon dioxide; glass spheres; glass powders; aluminum; clay; quartz; and the like. Also, reinforcing fibers such as fiberglass, carbon fibers, and the like may be used. The polyetherimides may also include additives such as titanium dioxide; thermal stabilizers, ultraviolet light stabilizers, plasticizers, and the like.

The polyetherimides of this invention may be fabricated into any desired shape, i.e., moldings, coatings, films, or fibers.

EXAMPLES

The following examples serve to give specific illustrations of the practice of this invention but they are not intended in any way to limit the scope of this invention.

Preparation of the dihydroxy end-capped oligomers

Poly(aryl ethers)—General Procedure.

The desired amount of dihydric phenol is charged to a flask containing a solvent mixture of monochlorobenzene and dimethyl sulfoxide. The phenol is converted to the disodium salt in situ by adding the required amount of NaOH. The system is dehydrated by heating and removing the monochlorobenzene-water azeotrope. The desired amount of dihalo benzenoid compound is then added and reacted with the sodium salt of the phenol at about 140° C. The polymer is recovered by filtering the solution, then precipitating, filtering, washing, and drying. The molecular weight of the oligomer is controlled by the amounts of the monomers used and to produce a hydroxy terminated oligomer a molar excess of the bisphenol is employed. The material is treated with acid, such as oxalic, hydrochloric, or citric acids to convert the terminal —ONa groups to —OH groups.

Using the procedure outlined above the following oligomers are prepared:

Oligomer A from excess of 2,2′-bis(4-hydroxyphenyl)propane ("bisphenol-A") and 4,4′-dichlorodiphenyl sulfone, mol. wt. 2,400.

Oligomer B from the reagents above, but having a molecular weight of 5,380.

Oligomer C from the reagents above, having a molecular weight of 10,000.

The procedure above is slightly modified in that (a) a higher boiling aprotic solvent (N-methylpyrrolidone or sulfolane) is used instead of the dimethylsulfoxide, and (b) the polycondensation is performed in the presence of the required amount of solid mixtures of $Na_2CO_3/K_2CO_3$ at temperatures of up to 220° C.

In this manner oligomer D is prepared. It is made from an excess of 4,4′-dihydroxydiphenyl sulfone and 4,4′-dichlorodiphenyl sulfone and has a molecular weight of 6,000.

The use of even higher boiling solvents (e.g., diphenyl sulfone) in conjunction with a carbonate mixture ($Na_2CO_3/K_2CO_3$) allows for the preparation of oligomer E from

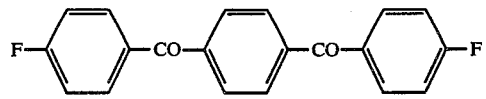

and excess of

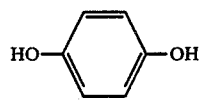

Oligomer E has a molecular weight of 4,450.

A dihydroxy terminated oligomer (F) of poly(phenylene oxide) having a molecular weight of 8,000 is prepared as described in U.S. Pat. No. 4,355,661.

Preparation of dianhydride end-capped oligomers

Oligomers A–F are transformed into the corresponding dianhydrides using methods described in the literature. Thus, the di-alkali metal salts of the oligomers are reacted with a nitro-substituted dinitrile such as

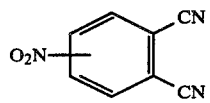

under conditions described in U.S. Pat. No. 3,972,902. Hydrolysis and cyclization lead to the desired dianhydrides. Alternatively, the dialkali metal salts can be reacted with a nitro-phthalimide as described in U.S. Pat. No. 3,879,428.

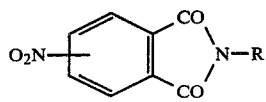

R=aryl, alkyl, etc.

Hydrolysis of the bis(etherphthalimide) yields the tetraacid salt. Acidification and dehydration gives the bis(ether anhydride).

Preparation of polymers

A mixture of 269.2 gms (0.1 moles) of the dianhydride made from oligomer A, 10.8 gms of m-phenylenediamine (0.1 mole) 1,000 ml. of m-cresol, and 200 ml of o-dichlorobenzene is heated at about 180°–200° C. for 6 hours. The water formed is removed by azeotropic distillation. The viscous reaction mixture is coagulated in about 10 times its volume of methanol. A fluffy polymer is obtained. It can be molded to a plaque displaying good mechanical properties.

The following polymers listed in the Table are prepared in a similar fashion.

TABLE I

| Reactants | Properties |
|---|---|
| Dianhydride from oligomer B + 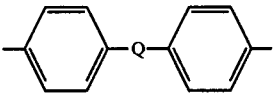 | Tough |
| Dianhydride from oligomer C + 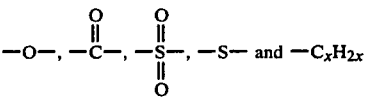 | Tough |
| Dianhydride from oligomer D + 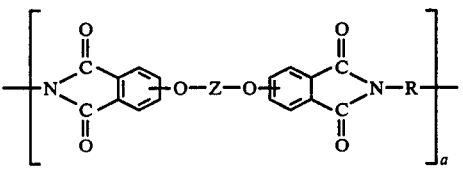 | Tough; displays good solvent resistance |
| Dianhydride from oligomer E + 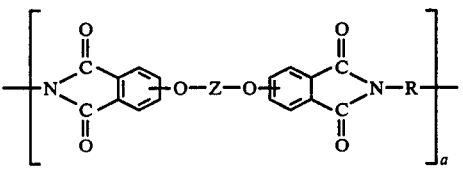 | Satisfactory toughness; excellent solvent resistance. |
| Dianhydride from oligomer F + 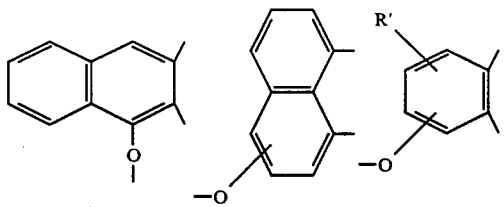 | Satisfactory toughness |

It is to be noted that the polyethermides of the instant invention can also be prepared by an alternate sequence of reactions, i.e., wherein a nitrophthalic anhydride (or a halophthalic anhydride) and/or any other nitro- or halo-substituted anhydride is first condensed with the diamine $NH_2$—R—$NH_2$, etc., as defined above, followed by the reaction of the so-obtained condensation product with the dihydroxy-terminated oligomer. Both preparative methods yield essentially equivalent polymers.

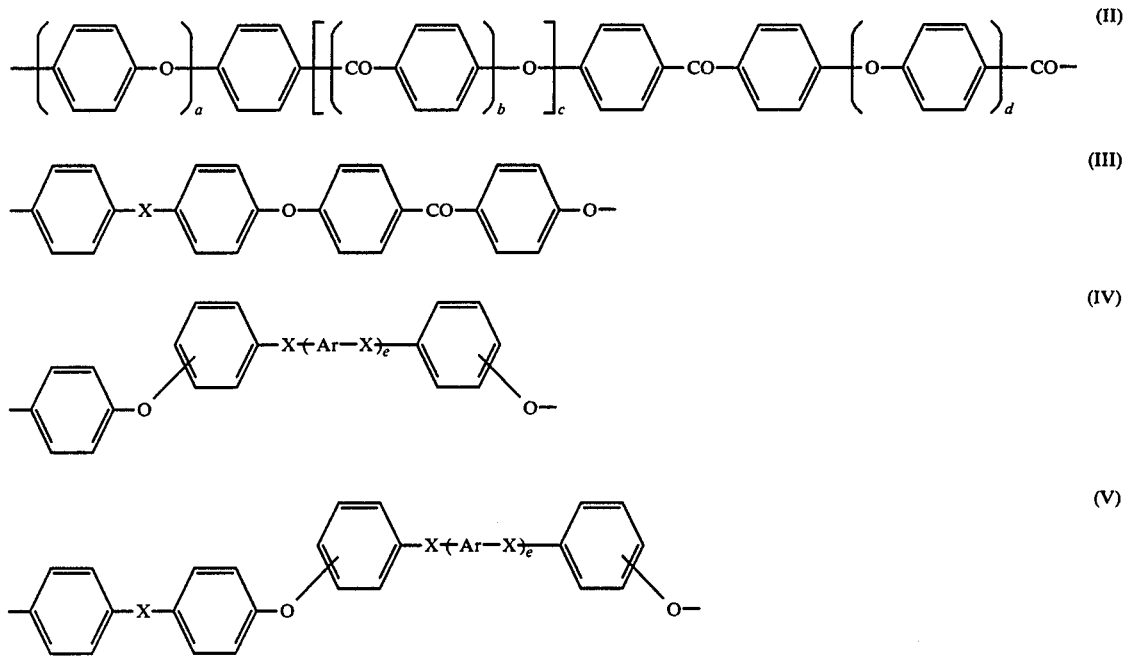
wherein Ar is independently a divalent aromatic radical selected from phenylene, biphenylene, or naphthalene, X is independently O,
$SO_2$, or a direct bond and a is an integer of from 1 to 4, b, c, d and e are 0 to 1.
15. A polyetherimide as defined in claim 14 wherein the poly(aryl ether ketone) is selected from one or more of the following:
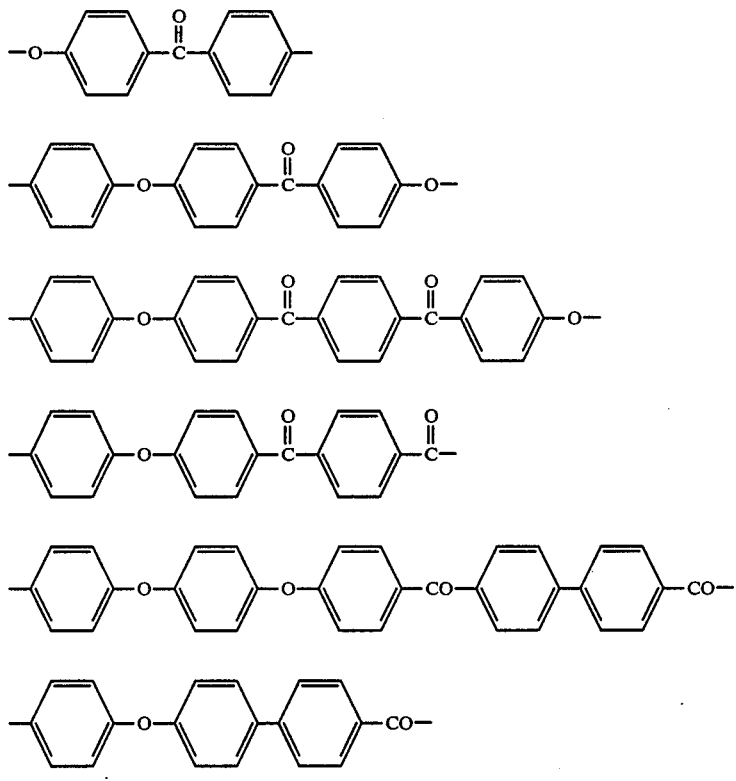

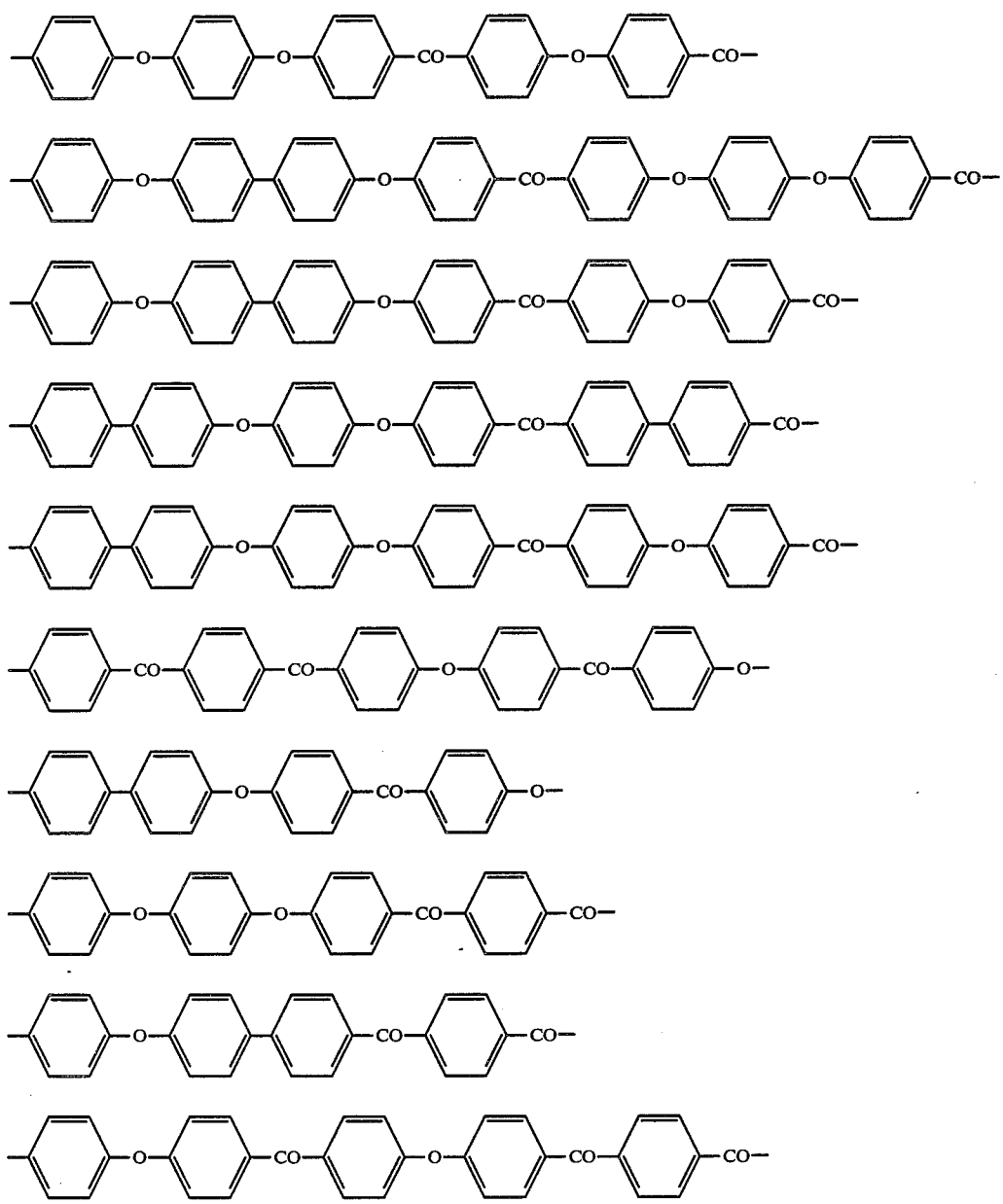

What is claimed is:

1. A polyetherimide of the formula:

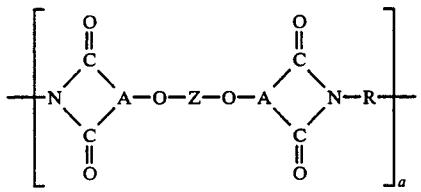

where a represents a whole number in excess of 1, the group —O—A< is selected from:

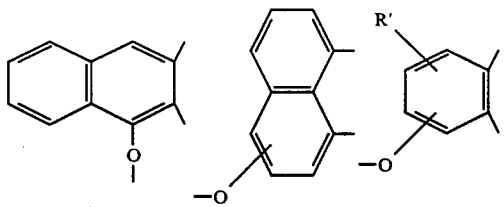

R' being hydrogen, lower alkyl or lower alkoxy, and the divalent bonds of the —O—Z—O— radical are in the 3,3';3,4';4,3' or the 4,4' position, Z is derived from a dihydroxy-terminated poly(phenylene oxides), a dihydroxy-terminated poly(aryl ether), or a dihydroxy-terminated poly(aryl ether ketone), wherein the molecular weight of Z is $\geq 1,500$, and R is a divalent organic radical selected from the class consisting of (1) aromatic hydrocarbon radicals having from 6–20 carbon atoms and halogenated derivatives thereof, (2) alkylene radicals and cycloalkylene radicals having from 2–20 carbon atoms, 2–8 carbon atoms containing alkylene terminated polydiorganosiloxane radicals, and (3) divalent radicals included by the formula

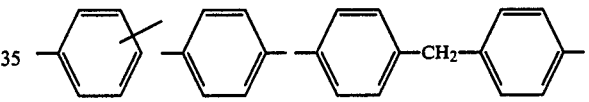

wherein Q is a member selected from the class consisting of

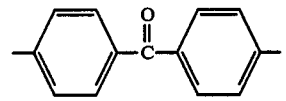

where x is a whole number from 1 to 5 inclusive.

2. A polyetherimide as defined in claim 1 of the formula:

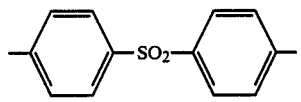

3. A polyetherimide as defined in claims 1 or 2 wherein R is selected from:

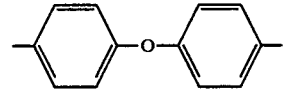

4. A polyetherimide as defined in claims 1 or 2 wherein R is metaphenylene.

5. A polyetherimide as defined in claim 1 wherein Z is derived from dihydroxy-terminated poly(phenylene oxides).

6. A polyetherimide as defined in claim 5 wherein the dihydroxy-terminated poly(phenylene oxides) are of the following formula:

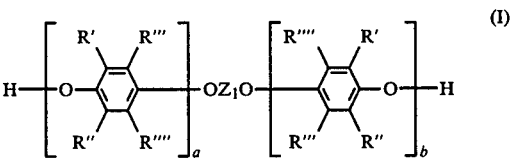

(I)

wherein independently each —OZ$_1$O— is a divalent aromatic residue derived from a quinone, Z$_1$ is a divalent arylene radical, a and b are at least such that the molecular weight of the dihydroxy compound be at least 1,500 or greater, the R groups are hydrogen, a hydrocarbon radical, a halohydrocarbon radical having at least 2 carbon atoms between the halogen atoms and phenol nucleus, a hydrocarbonoxy radical, or a halohydrocarbonoxy radical having at least two carbon atoms between the halogen atoms and the phenol nucleus.

7. A polyetherimide as defined in claim 6 wherein the R groups are hydrogen.

8. A polyetherimide as defined in claim 1 wherein Z is derived from a dihydroxy-terminated poly(aryl ether).

9. A polyetherimide as defined in claim 8 wherein the dihydroxy-terminated poly(aryl ether) is derived from

—O—E—O—E'— wherein E is the residuum of the dihydric phenol, and E' is the residuum of the benzenoid compound having an inert electron withdrawing group in at least one of the positions ortho and para to the valence bonds; both of said residua being valently bonded to the ether oxygens through aromatic carbon atoms.

10. A polyetherimide as defined in claim 9 wherein the poly(aryl ether) is derived from the following dihydric phenol:

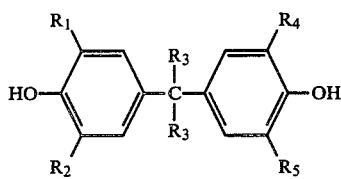

in which the R$_1$, R$_2$, R$_3$, R$_4$, R$_5$ groups represent independently hydrogen, lower alkyl, aryl and the halogen substituted groups thereof, which can be the same or different.

11. A polyetherimide as defined in claim 10 wherein the dihydric phenol is one or more of the following:

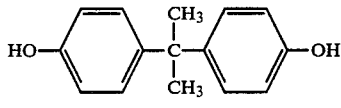

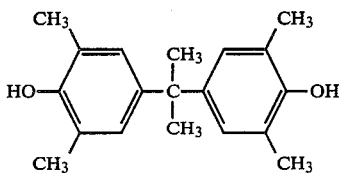

-continued

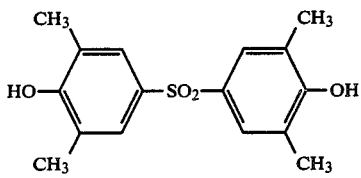

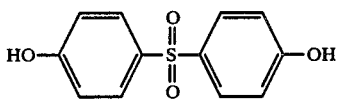

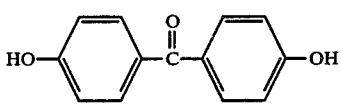

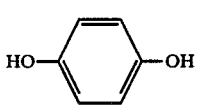

12. A polyetherimide as defined in claim 8 wherein the poly(aryl ether) is selected from one or more of the following:

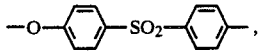

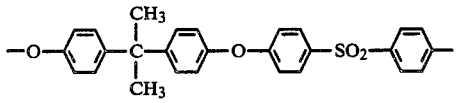

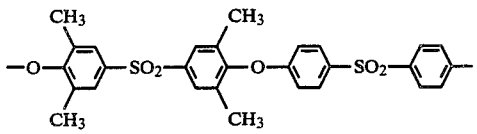

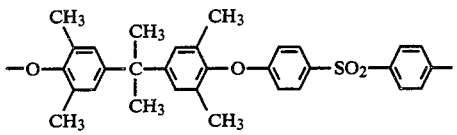

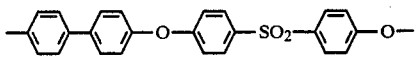

13. A polyetherimide as defined in claim 1, wherein Z is derived from a dihydroxy-terminated poly(aryl ether ketone).

14. A polyetherimide as defined in claim 13 wherein the poly(aryl ether ketone) is one of the formula:

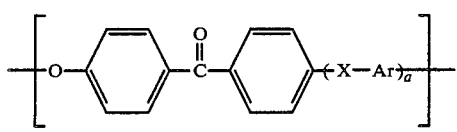

(I)